INVENTOR.
GEORGE F. ADOLPHI
BY Strauch, Nolan, Neale,
Nies & Bronaugh
ATTORNEYS

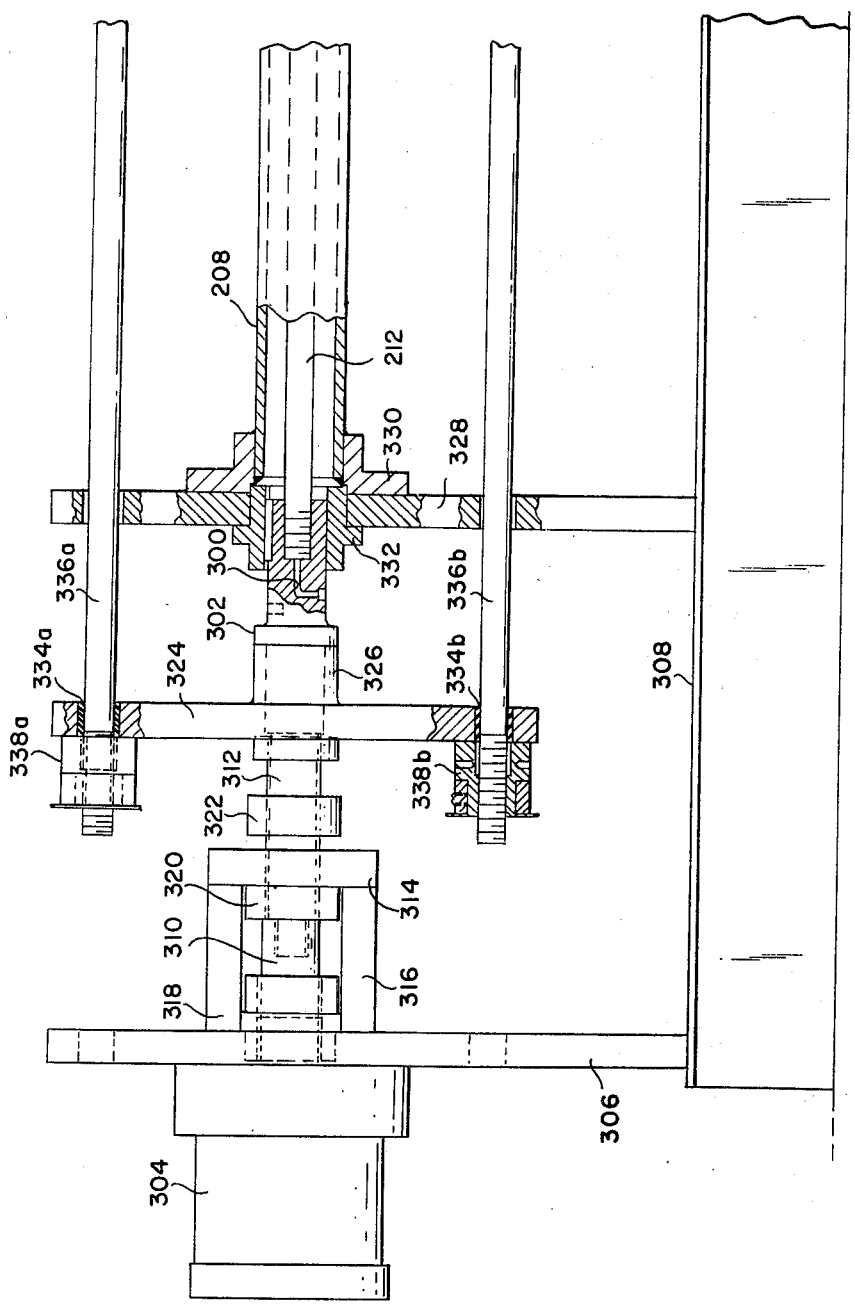

May 19, 1970 G. F. ADOLPHI 3,512,385
BELLOWS FORMING MACHINE
Filed July 12, 1966 13 Sheets-Sheet 3

INVENTOR.
GEORGE F. ADOLPHI
BY Strauch, Nolan, Neale,
Nies & Bronaugh
ATTORNEYS

May 19, 1970          G. F. ADOLPHI          3,512,385

BELLOWS FORMING MACHINE

Filed July 12, 1966          13 Sheets-Sheet 4

INVENTOR.
GEORGE F. ADOLPHI
BY
Strauch, Nolan, Neale,
Nies & Bronaugh
ATTORNEYS

May 19, 1970

G. F. ADOLPHI 3,512,385

BELLOWS FORMING MACHINE

Filed July 12, 1966

INVENTOR.
GEORGE F. ADOLPHI

BY Strauch, Nolan, Neale,
Nies & Bromaugh
ATTORNEYS

May 19, 1970  G. F. ADOLPHI  3,512,385
BELLOWS FORMING MACHINE
Filed July 12, 1966  13 Sheets-Sheet 6

INVENTOR.
GEORGE F. ADOLPHI
BY
Strauch, Nolan, Neale,
Nies & Bronaugh
ATTORNEYS

INVENTOR.
GEORGE F. ADOLPHI

May 19, 1970        G. F. ADOLPHI        3,512,385
BELLOWS FORMING MACHINE
Filed July 12, 1966        13 Sheets-Sheet 8
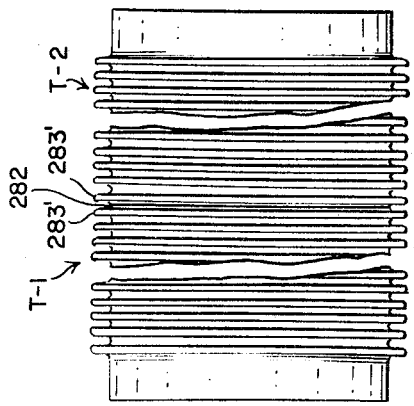
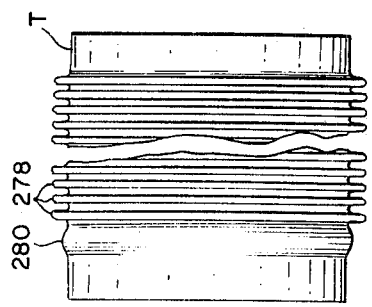
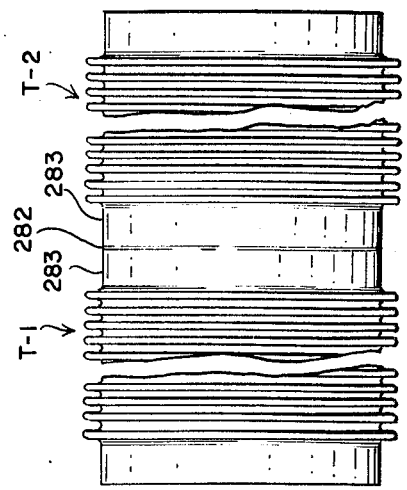
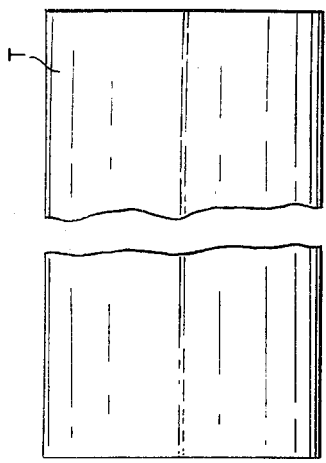
INVENTOR.
GEORGE F. ADOLPHI
BY
Strauch, Nolan, Neale,
Nies & Bronaugh
ATTORNEYS Note:
"A" = Aft
"F" = Forward May 19, 1970 G. F. ADOLPHI 3,512,385
BELLOWS FORMING MACHINE
Filed July 12, 1966 13 Sheets-Sheet 12

INVENTOR.
GEORGE F. ADOLPHI
BY
Strauch, Nolan, Neale,
Nies & Bronaugh
ATTORNEYS

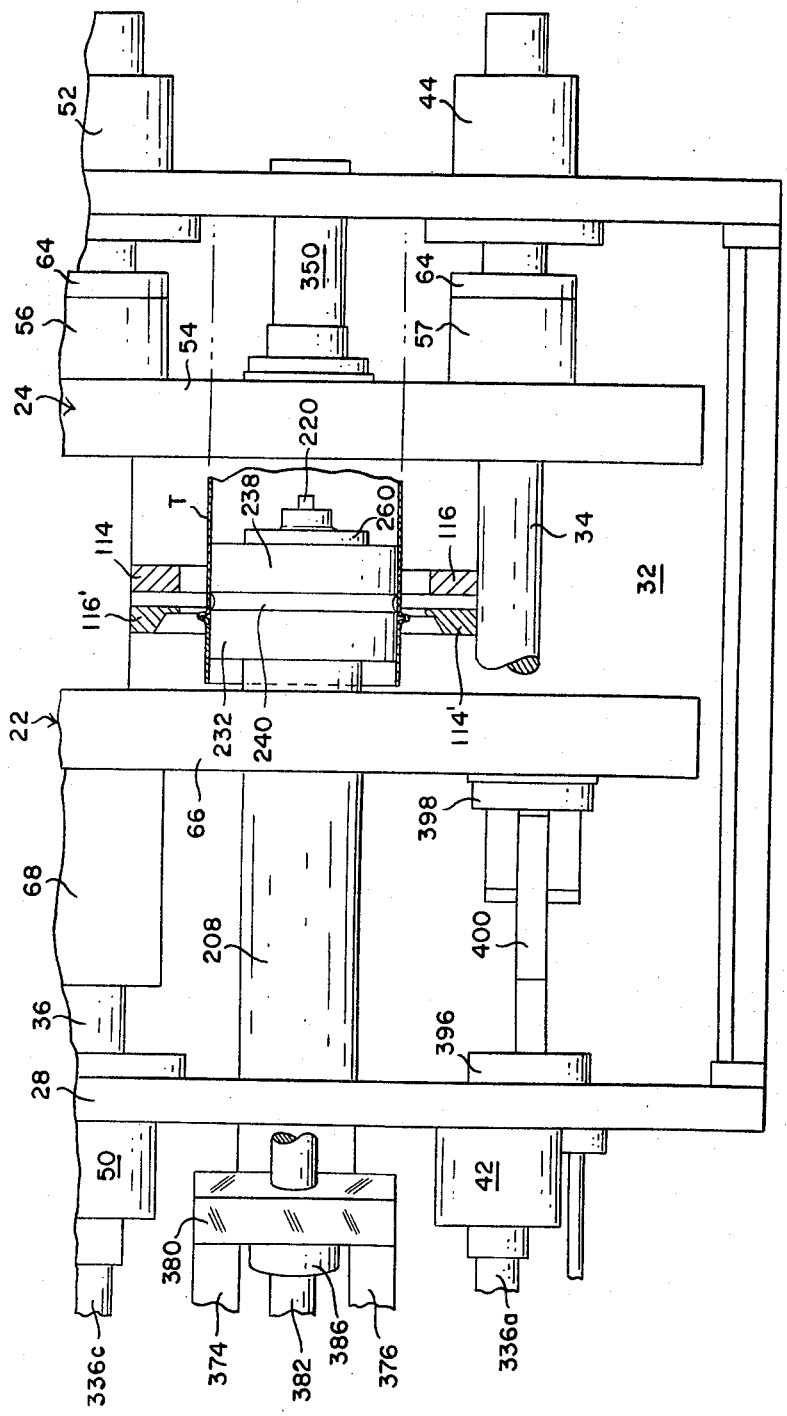

United States Patent Office 3,512,385
Patented May 19, 1970

3,512,385
BELLOWS FORMING MACHINE
George F. Adolphi, La Mesa, Calif., assignor, by mesne assignments, to Ametek, Inc., New York, N.Y., a corporation of Delaware
Filed July 12, 1966, Ser. No. 564,579
Int. Cl. B21d 15/06
U.S. Cl. 72—59                                    12 Claims

ABSTRACT OF THE DISCLOSURE

The fabrication of bellows in a machine and by a technique in which a tubular conduit is progressively corrugated by initial application of internal pressure to an externally unconfined annular band to produce an inchoate convolution which is thereafter completed by axial compression of the opposite ends of the inchoate convolution while maintaining the internal pressure therein.

The present invention relates to improvements in transversely corrugated conduits for bellows and to improvements in apparatus and method of making such conduits or bellows.

Bellows have been formed in the past in a variety of ways as illustrated by U.S. Pat. 971,838 issued Oct. 4, 1910 to W. M. Fulton for Process of Making Tubular Metal Walls; No. 976,060 issued Nov. 15, 1910 to W. M. Fulton for Flexible Corrugated Metal Wall for Collapsible and Expansible Vessels; No. 1,823,532 issued Sept. 15, 1931 to W. B. Clifford of Method of Forming Bellows Folds; No. 2,563,578 issued Aug. 7, 1951 to E. T. Candee for Flexible Corrugated Seamless Metal Tubing and No. Re. 24,710 issued Oct. 6, 1959 to J. W. Yowell et al. for Bellows.

In the present invention, a tubular conduit is fed in steps through a corrugation or convolution forming station in which an inchoate convolution is formed by internal pressure applied to an annular band of predetermined axial length and the inchoate convolution completed by axial compression of the opposite ends to the corrugation. In this respect, the present invention superficially resembles the method disclosed in the aforesaid patent of Candee. It differs therefrom, however in certain critical respects which assure more perfect convolution formation and which adapt it for use in forming large diameter and/or long conduits.

The principle objects of the present invention are to provide:

(a) A bellows forming machine in which and method by which a tubular conduit is progressively corrugated by initial application of internal pressure to an externally unconfined annular band of predetermined axial extent delimited by bands of external radial confinement to produce an inchoate convolution and thereafter completing the convolution by axial compression of the opposite ends of the inchoate convolution while maintaining the internal pressure thereon.

(b) A bellows, and a machine and method of making a bellows in which the bellows is continuously corrugated throughout its length and is formed by a plurality of corrugated sections, each adjacent pair being joined end to end by a butt weld located at the root of a corrugation.

The foregoing and other subsidiary and ancillary objects of the present invention will become more fully apparent by reference to the appended claims and as the following detailed description proceeds in reference to the accompanying drawings in which:

FIG. 1A is a side elevational view, partially in section, of the forward half of the bellows machine constructed in accord with the present invention, illustrating the configuration of the components at the end of what will hereinafter be termed "stage 1" of its operation;

FIG. 1B similarly illustrates the rear half of the machine as illustrated in FIG. 1A constituting a left hand continuation of the view of FIG. 1A;

FIG. 8 is a view illustrating a typical tube of the type used in the machine illustrated in FIGS. 1A–2B to provide a corrugated bellows or tube;

FIG. 9 is a view illustrating the corrugated tube or bellows resulting from the utilization of the machine of FIGS. 1A–2B to corrugate tube of the form of FIG. 8;

FIG. 10 illustrates the manner in which a plurality of corrugated tubes of the form of FIG. 9 can be joined by butt welding;

FIG. 11 illustrates the completion of corrugation of butt welded multi-sectional corrugated conduit of the form of FIG. 10 after the adjacent ends have been corrugated in the machine of FIGS. 1A–2B without stressing the butt weld;

Figure 15:
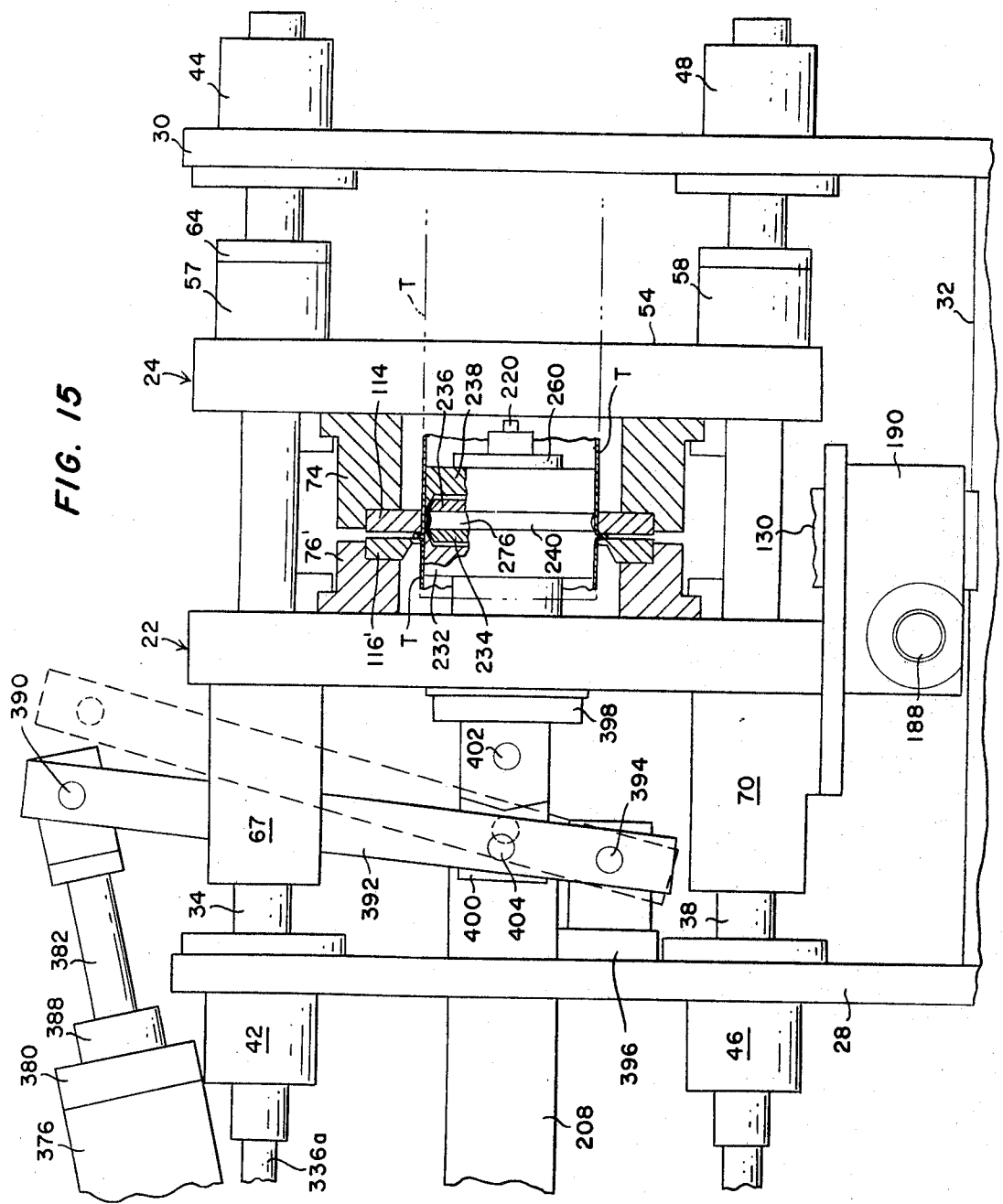

FIG. 15 is a side elevational view of the corrugation forming section of the machine of FIGS. 1A–2B illustrating the configuration of the components at the end of stage 5; and FIG. 16 is a top plan view of the corrugation forming section of the machine of FIGS. 1A–2B illustrating the configuration of the components at the end of stage 7 and the beginning of stage 1.

Figure 1A:
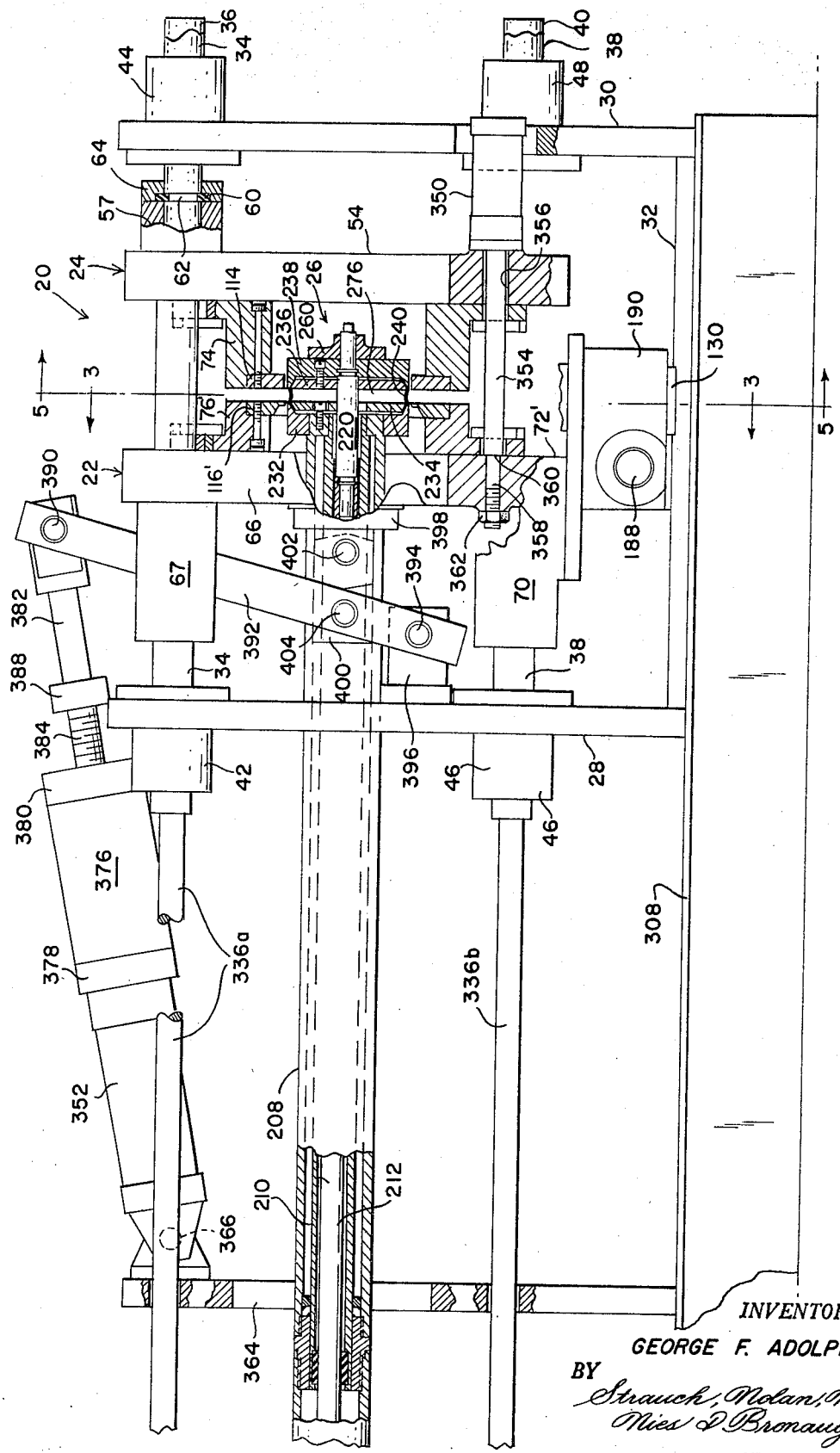

Referring now to the drawings in detail, and particularly to FIG. 1A, the bellows forming machine of the present invention is provided with a corrugation forming section 20 to which a cylindrical metal tube is fed from the right and from which corrugated tubing is fed to the left. The corrugation forming section comprises a pair of platen assemblies 22 and 24 embracing the tube and a mandrel head assembly 26 disposed within the tube.

Platen assembly mounting (FIGS. 1A, 2A, and 3–6)

Figure 5:
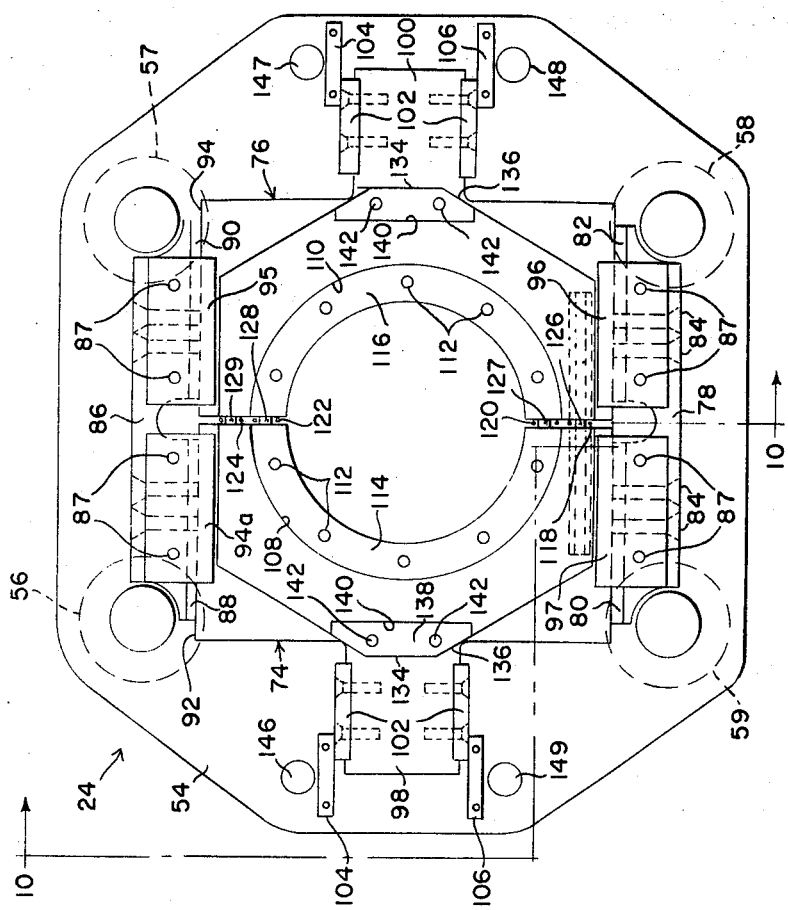
FIG. 5 is a rear view of the forward platen assembly, being in effect a view taken substantially along the line 5—5 of FIG. 1A.
Figure 6:
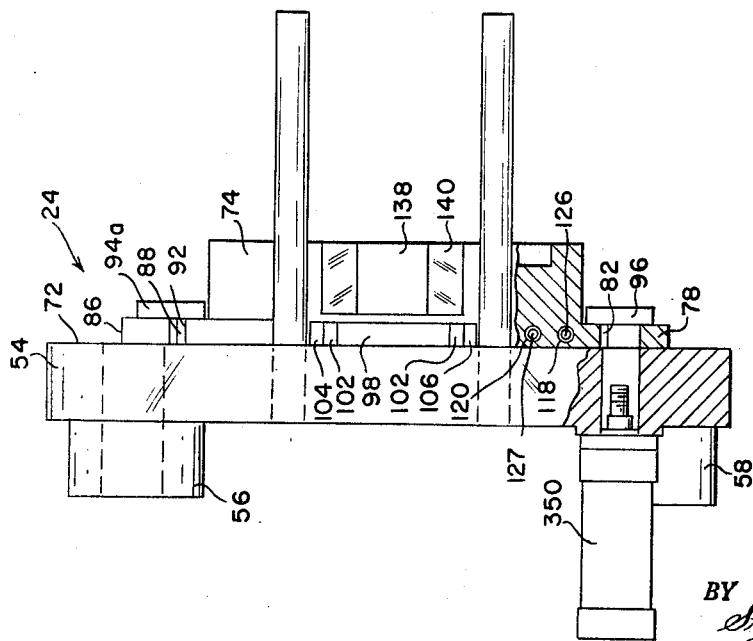
FIG. 6 is a left side view, partially in section, of the structure illustrated in FIG. 5.

Platen assemblies 22 and 24 are supported between a pair of vertically extending fixed frame plates 28 and 30 fixed to a base plate 32 and interconnected by side plates (not shown). The platens 22 and 24 are supported between frame plates 28 and 30 by four parallel shafts 34, 36, 38 and 40. Shaft 34 is supported for limited longitudinal reciprocation relative to plates 28 and 30 by aligned bearing supports 42 and 44. Shaft 38 is similarly supported by bearing supports 46 and 48, shaft 36 by bearing supports 50 and 52 (see FIG. 2A) and shaft 40 by similar bearing supports (not shown) located in alignment beneath supports 50 and 52. Platen assembly 24, the details of which are illustrated in FIGS. 5 and 6 includes a platen casting 54 from the forward face of which project four bosses 56, 57, 58 and 59 (FIG. 5) through which the shafts 36, 34, 38 and 40 respectively extend. As is aparent from FIG. 1A, the boses 56–59 each coact with a retainer ring, such as 60 for boss 57, received within annular grooves 62 in the shafts 34–40 and end caps 64 to fix the platen 24 to the shafts 34–40 for longitudinal movement therewith between plates 28 and 30.

Figure 3:
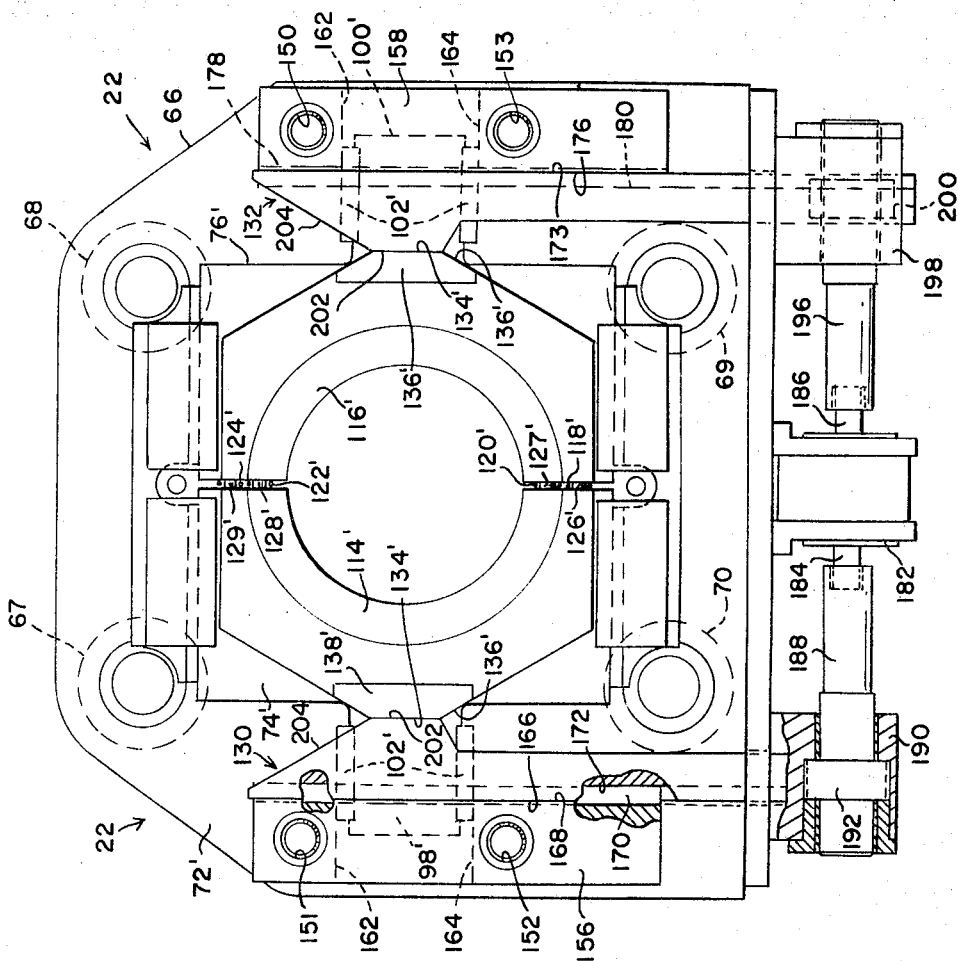
FIG. 3 is a front view of the rear platen assembly, partially in section, being in effect a view taken substantially along the line 3—3 of FIG. 1A.

As is most clearly apparent from FIG. 3, the platen assembly 22 has a platen casting 66 from the rear face of which projects four bosses 67, 68, 69 and 70 through which the shafts 34, 36, 40 and 38 respectively extend in axial sliding relation. By this construction the platen 22 is supported by the shafts 34–40 for longitudinal movement between the plates 28 and 30 independently of the shafts 34–40 and independently of the platen 24. The configuration of the mechanism illustrated in FIG. 1 shows the extreme right-hand positions of the platen assemblies 24 and 22 and the maximum separation of the platens 22 and 24. The mechanism for controlling the motions of these platens 22 and 24 will be described presently.

Forward platen assembly (FIGS. 5 and 6)

The forward platen assembly 24 is illustrated in detail in FIGS. 5 and 6. The rear face 72 of the casting 54 is planar as indicated in FIG. 6. Mounted for converging and diverging lateral rectilinear movements over the face 72 are a pair of slide clamps 74 and 76. Slide clamps 74 and 76 are supported by a bearing block 78 having wear plates 80 and 82 fixed to its top horizontal face by suitable means such as screws 84. The top surfaces of the slide clamps 74 and 76 are similarly confined by a block 86 fixed to the casting 54 by screws 87 and having wear plates 8 and 90 against which the top surface 92 and 94 of the slide clamps 74 and 76 respectively bear. The slide clamps 74 and 76 are retained against the face 72 of the casting 54 by retainer plates 94a, 95, 96 and 97 secured to the casting 54 by screws 87 passing through aligned apertures in the blocks 78 and 86.

The slide clamps 74 and 76 are further supported and guided by their oppositely extending tongues 98 and 100 which have wear plates 102 fixed to their upper and lower surfaces and which are confined vertically between upper and lower wear plates 104 and 106 fixed to the casting 54.

The face of the castings of the slide clamps 74 and 76 remote from the casting 54 are formed with semicylindrical recesses 108 and 110 in which are fixed, as by bolts 112, a pair of semi-circular clamping ring segments 114 and 16. These ring segments 114 and 116 engage the exterior of the tube T to complete the formation of a corrugation in the tube as will be explained presently.

The slide clamps 74 and 76 are shown in FIG. 5 in their tube embracing position, they are resiliently biased to a laterally separated position by four compression springs 118, 120, 122 and 124 surrounding guide pins 126, 127, 128 and 129 respectively and received within aligned blind bores in the opposed faces of the castings of slide clamps 74 and 76.

The slide clamps 74 and 76 are moved to their convergent position as shown in FIG. 5 by the action of wedges 130 and 132 (FIG. 3) between which they are located and by which they are actuated as will be explained presently. These wedges 130 and 132 act against the vertical faces 134 and inclined faces 136 of wear blocks 138 fixed in recesses 140 in the castings of the slide clamps 74 and 87, as is most clearly shown in FIGS. 5 and 6, by bolts 142.

Projecting from the rear face 72 of the casting 54 are four guide pins 146, 147, 148 and 149 which are axially slidably engaged, in assembly, with the bearings 150, 151, 152 and 153 of the platen assembly 22 as will be explained presently to maintain the two assemblies in perfect axial alignment throughout their paths of relative motion.

Figure 4:
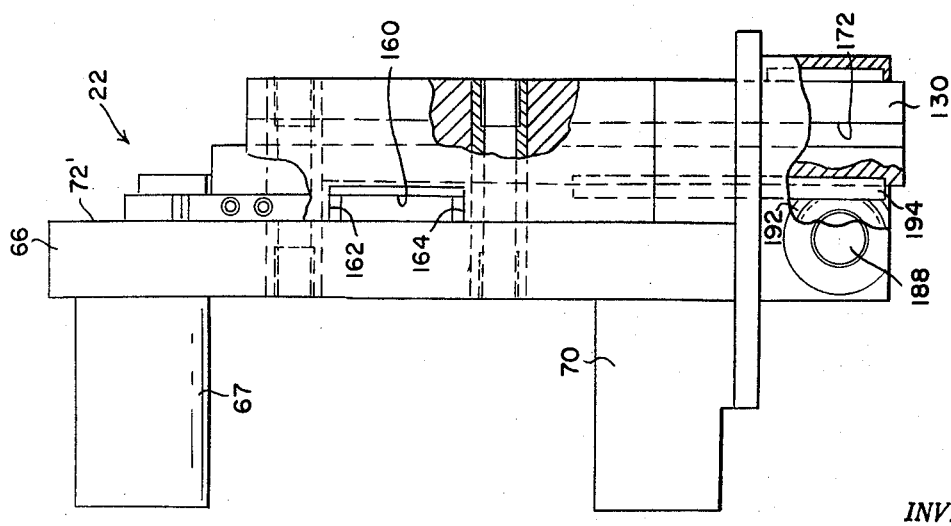
FIG. 4 is a left side elevtaional view, partially in section, of the structure illustrated in FIG. 3.

Aft platen assembly (FIGS. 3 and 4)

The structure of the aft platen assembly 22 is illustrated in detail in FIGS. 3 and 4. It comprises a pair of opposed slide clamps 74' and 76' mounted for converging and diverging movement over the face 72' of the casting 66 in the same manner as described for the slide clamps 74 and 76 in reference to FIGS. 5 and 6 with certain exceptions which will be explained in detail herein.

Mounted on each side of the casting 66 are opposed wedge guide blocks 156 and 158. Blocks 156 and 158 are fixed to the casting 66 and are formed with through bores in which the bearings 150 through 153 are mounted to receive the guide pins 146 through 149 which are fixed to the casting 54 of the forward platen assembly 24 as shown in FIGS. 5 and 6. The guide blocks 156 and 158 are formed on their faces abutting surface 72' of casting 66 with rectangular notches 160 (FIG. 4) through which the tongues 98' and 100' respectively of the slide clamps 74' and 76' extend, the upper and lower surfaces 162 and 164 of notches 160 (FIG. 4) providing the guide surfaces against which the wear plates 102' of the tongues 98' and 100' act.

The wedge 130 has a planar surface 166 which abuts a planar surface 168 on the guide block 156. The rectilinear path of motion of the wedge 130 over the surface 168 is defined by a key 170 fixed to the guide block 156 and engaging a longitudinally extending channel or groove 172 in the surface 166 of the wedge 130.

The wedge 132 is similarly supported and guided by wedge guide block 158, its surface 173 bearing against the surface 176 of the guide block 158 and its path of travel being defined by a key 178 engaging its longitudinally extending groove 180.

Wedges 130 and 132 are driven vertically concomitantly by a hydraulic rotary motor 182 having oppositely extending shafts 184 and 186. Shaft 184 is splined to a shaft 188 journalled in bearing support 190 and having a pinion 192 fixed thereon internally of bearing support 190. Pinion 192 is in constant mesh with a rack 194 fixed to the side of the wedge 130 as is most clearly shown in FIG. 4. Shaft 186 is similarly spline connected to a shaft 196 journalled in a bearing support 198 and having a pinion 200 fixed thereon internally of the bearing support 198 and engaging a rack (not shown) fixed to the wedge 132 in the same manner as the rack 194 is fixed to the wedge 130.

With this construction, rotation of the shafts 184 and 186 in a counterclockwise direction as viewed in FIG. 4 will concomitantly lift the wedges 130 and 132 and rotation of the shafts 184 and 186 in a clockwise direction will concomitantly lower the wedge 130 and 132.

The slide clamps 74' and 76' are provided with wear plates 138' having vertical bearing surface 134' and inclined bearing surfaces 136'. These surfaces 134' and 136' cooperate respectively with the surfaces 202 and 204 of the wedges 130 and 132. When the wedges 130 and 132 are in their uppermost positions as illustrated in FIG. 3, the surfaces 202 abut the surfaces 134' of the slide clamps 74' and 76' and the surfaces 134 of the slide clamps 74 and 76 to hold them on their convergent positions as illustrated in FIGS. 3 and 5 and in opposition to the biasing force of the springs 118–124 and 118'–124'. When the wedges 130 and 132 are lowered so that the surfaces 202 are disengaged from the surfaces 134 and 134', the slide clamps are outwardly biased so that the surfaces 136 and 136' of the slide clamps 74, 74', 76 and 76' engage the surfaces 204 of the wedges 130 and 132, the degree of separation of the slide clamps 74 and 76 and 74' and 76' being determined by the vertical position of the wedges 130 and 132 as determined by the hydraulic motor 182.

By this construction, rotation of the hydraulic motor 182 in one direction will permit separation of the slide clamps 74 and 76 and 74' and 76' and in the opposite direction will force the slide clamps together and lock them in their convergent positions as illustrated in FIGS. 3 and 5.

Figure 7:
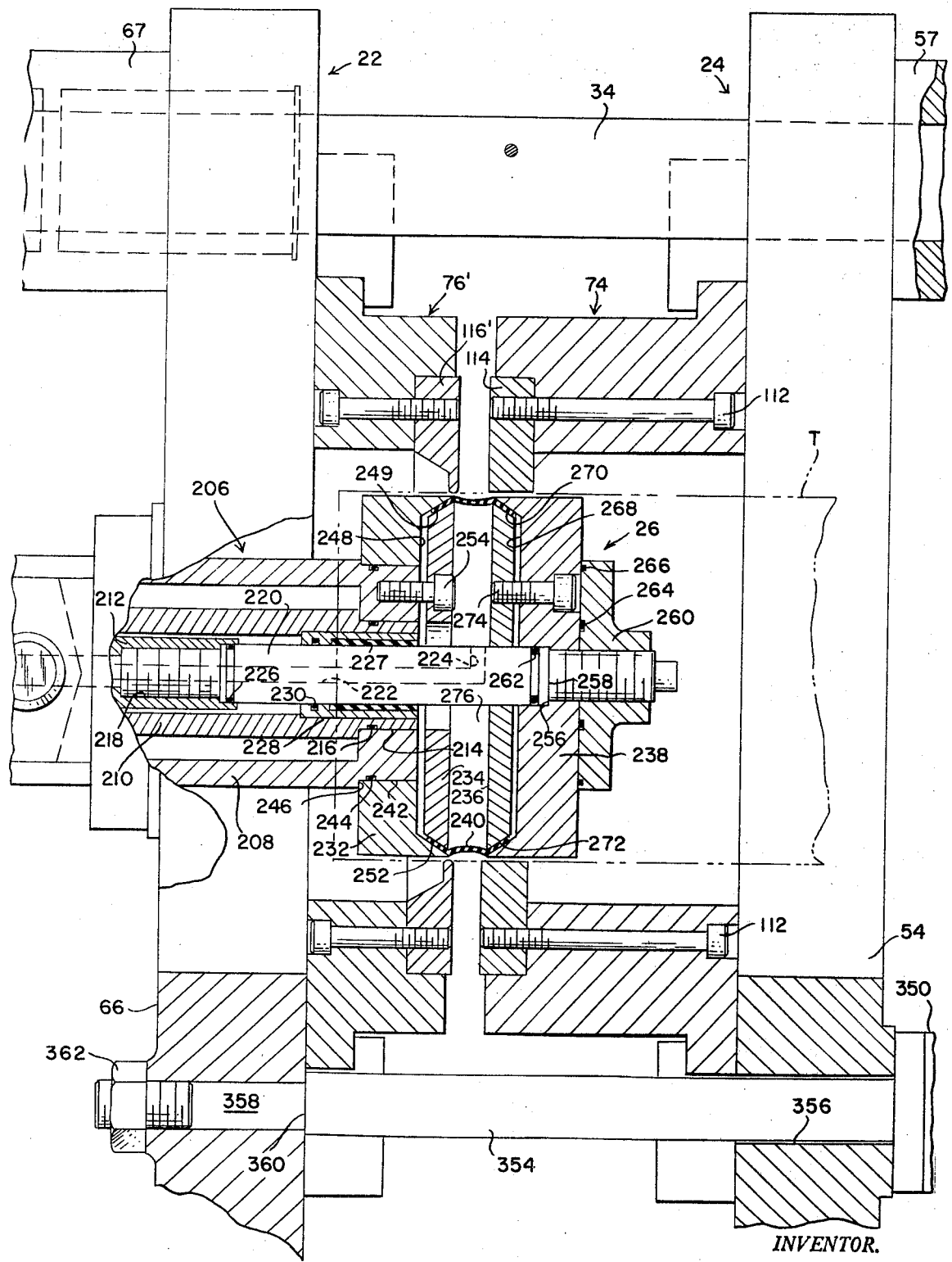
FIG. 7 is an enlarged view of the corrugation forming section as illustrated in FIG. 1A.

Mandrel head assembly 26 (FIG. 7)

The mandrel head assembly 26 is best illustrated in FIG. 7. As is there apparent, the mandrel head assembly 26 is disposed internally of and coaxial with the ring segments 114, 116, 114' and 116' of the slide clamps 74 and 76 and 74' and 76' when they are in their convergent positions as illustrated in FIGS. 3 and 5.

Mandrel head assembly 26 is cantilever supported upon the end of a mandrel assembly 206 consisting of an outer tubular shaft 208, an intermediate tubular shaft 210, and a central tubular shaft 212 all arranged in coaxial relation and supported as will be explained presently.

Shafts 208 and 210 have interfitting cylindrical surfaces at 214 and an annular O-ring seal 216 preventing fluid flow therebetween along their interfitting surfaces at 214. Tubular shaft 212 terminates in an internally threaded bore at 218 into which is threaded a shaft 220. Shaft 220 has an internal coaxial passage 222 terminating in a radial passage 224. An O-ring seal 226 between shafts 212 and 220 prevents fluid from flowing between the bore of shaft 212 and the space between shafts 212 and 210. Shaft 220 is supported for axial movement relative to the shaft 210 by a bearing 227 supported by bearing retainer 228 fixed within the end of the shaft 210. An O-ring 230 forms a fluid tight seal between the bearing retainer 228 and the shaft 220.

The mandrel head assembly consists basically of four discs 232, 234, 236 and 238 and an annular diaphragm or bladder 240. Disc 232 is received upon a reduced diameter portion 242 of shaft 208, being sealed in fluid tight relation therewith by an O-ring 244 and abutting a radial shoulder 246 thereon. The face of disc 232 opposite shaft 208 is formed with an end recess 248 having a frusto-conical side wall 249. The disc 234 which has a frusto-conical peripheral surface 252 is received within the recess 248 and clamps one end of the annular diaphragm 240 between the surfaces 252 and 249. A series of machine screws 254 threaded into aligned apertures in the end of the shaft 208 rigidly clamps discs 234 and 232 together with the end of the bladder 240 therebetween and secures these parts to the shaft 208.

Discs 236 and 238 are mounted on shaft 220, disc 238 being formed with an internal radial shoulder 256 seated against an external radial shoulder 258 on shaft 220 and fixed thereon by a nut 260 threaded on the end of shaft 220. An O-ring 262 provides a fluid tight seal between disc 238 and shaft 220. Further O-rings 264 and 266, coaxial with the shaft 220, provide fluid tight seals between the end face of disc 238 and the abutting face of the nut 260.

Disc 238 is formed with a end recess 268 having a frusto-conical wall 270 in which is seated the disc 236. The forward end of the annular bladder 240 is clamped between the frusto-conical peripheral surface 272 of the disc 236 and the frusto-conical surface 270 of the recess 268. Disc 236 is clamped to disc 238 by an annular row of machine screws 274 located in the annular band between the O-rings 264 and 266.

The space internally of bladder 240 between the discs 234 and 236 defines a chamber 276 filled with hydraulic fluid the pressure of which is controlled by pumping fluid into the chamber 276 through the passage 222 and 224 in the shaft 220 and relieving pressure therethrough as will be explained presently.

Shaft 208 and discs 234 and 236 are fixed while shafts 212 and 220 and discs 236 and 238 may be moved from their extreme right hand position as illustrated in FIG. 7 toward disc 234 to permit the bladder 240 to expand radially outwardly outwardly between the slide clamps 74, 74', 76, and 76' as will be explained presently to form a corrugation in a tube (indicated generally at T in FIG. 7 which is inserted over the mandrel head assembly 26 internally of the slide clamps.

The corrugated tube (FIGS. 8–11)

In one practical form of the present invention, the machine of the present invention receives a cylindrical tube T such as shown in FIG. 8 and converts this tube into an elongated bellows as indicated in FIG. 9. For example, the tube T of FIG. 8 may be a cylindrical tube twelve inches in diameter, twenty feet long and having a wall thickness of .020 inch formed by longitudinally seam welding the abutting edges of cylindrically rolled sheet metal. One end of such a tube T is slipped over the mandrel head assembly 26 to the position indicated in FIG. 7. In a succession of seven steps, as will be explained presently in reference to FIG. 12, the mandrel head assembly 26 and the platen assembly 22 and 24 are actuated to form each of a series of corrugations or convolution in the wall of the tube T, as is indicated in FIG. 9, thereby substantially foreshortening the overall length of the tube T. In FIG. 9, the fully formed convolutions are indicated at 278 and an inchoate convolution is indicated at 280. In one practical form of the invention, the center-to-center spacing of the crest of a convolution is approximately ⅜″ and the radial depth of the convolution is about ½″. The radial depth of the inchoate convolution is about ¼″.

After a tube T has been formed with convolutions over the major portion of its length, it is removed from the machine and, if a greater tube length is required, one or more convoluted tube sections may be butt welded together as indicated at 282 in FIG. 10. The adjacent unconvoluted end sections 283 of each of the tubes to be joined (denominated T–1 and T–2 in FIG. 10) are cut to precise length so that after they are butt welded together as indicated in FIG. 10, the assembly of FIG. 10 can be replaced in the machine of FIGS. 1A and 1B and the unconvoluted end sections 283 of the welded together tubes T–1 and T–2 convoluted as indicated at 283' in FIG. 11 while leaving the butt weld 282 at the root a convolution so that it not stressed in completing the convolution of the tube.

Figure 12:
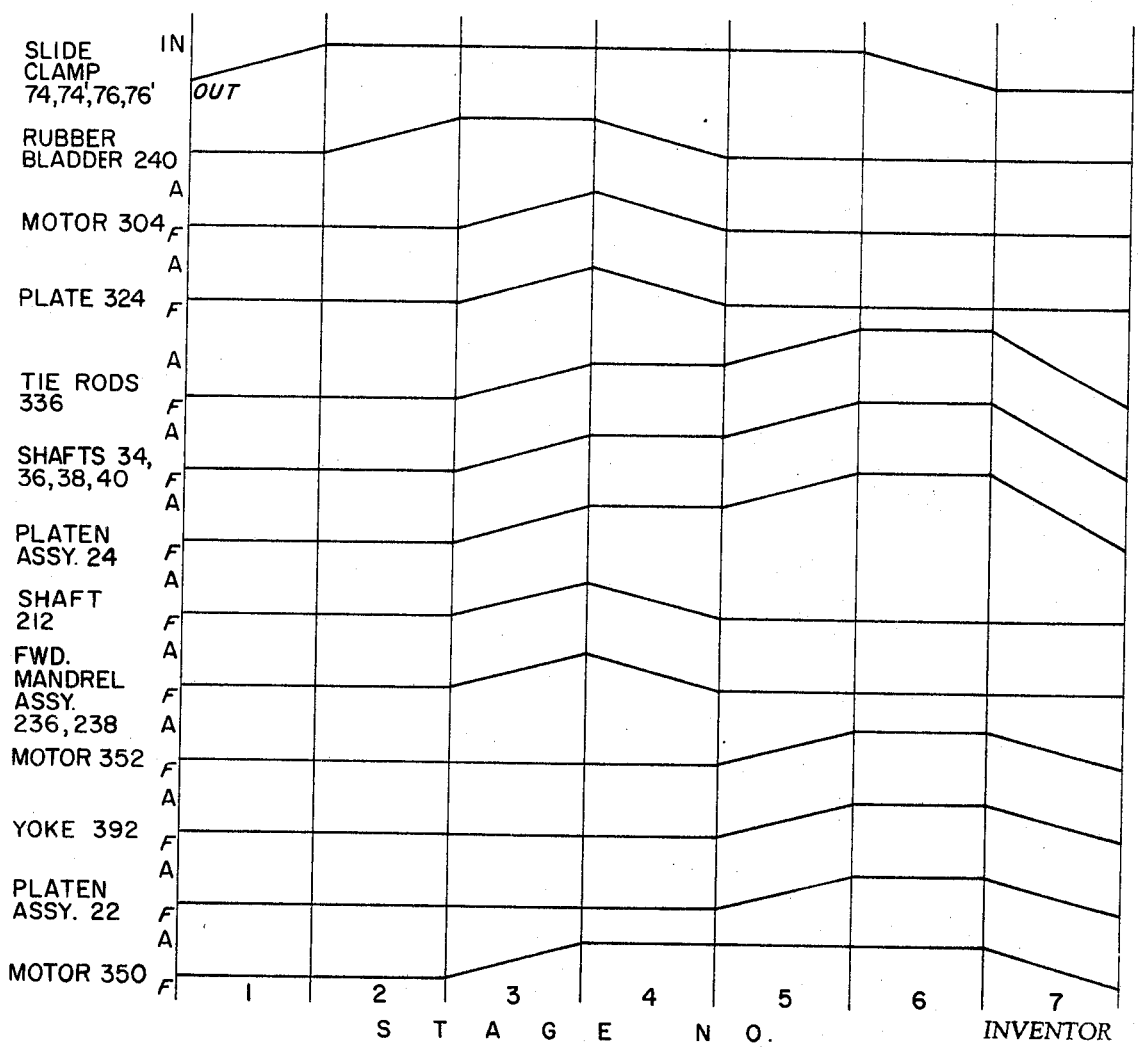
FIG. 12 is a sequence diagram illustrating the seven sequential stages of operation of the machine of FIGS. 1A–2B.

Machine operation sequence (FIG. 12)

The sequence of operation of the convolution forming section of the bellow machines of this invention is illustrated in FIG. 12. In this figure, the seven stages of operation of the machine are illustrated, the pictorial illustration at the top showing the configuration of components of the corrugation forming section at the end of the several stages and the references to other views indicate the drawings in which more complete illustrations of the machine at the end of the several stages may be found. As illustrated in FIG. 12, at the beginning of stage 1 (see also FIG. 16), the four slide clamp clamping ring segments 114, 114', 116 and 116' are away from the tube T, the platen assemblies 22 and 24 are both in their forward positions (indicated by the letter "F" in the diagram) and at their maximum degree of separation, the discs 236 and 238 of the mandrel head assembly 26 being in their forward positions and fully separated from stationary discs 232 and 234 and the bladder 240 being fully relaxed.

During stage 1, the slide clamp assemblies 74, 74', 76, and 76' are brought in so that rings 114, 114', 116 and 116' closely embrace the tube T. The other components remain unchanged. FIGS 1A and 1B illustrate the machine at the end of stage 1.

Figure 2A:
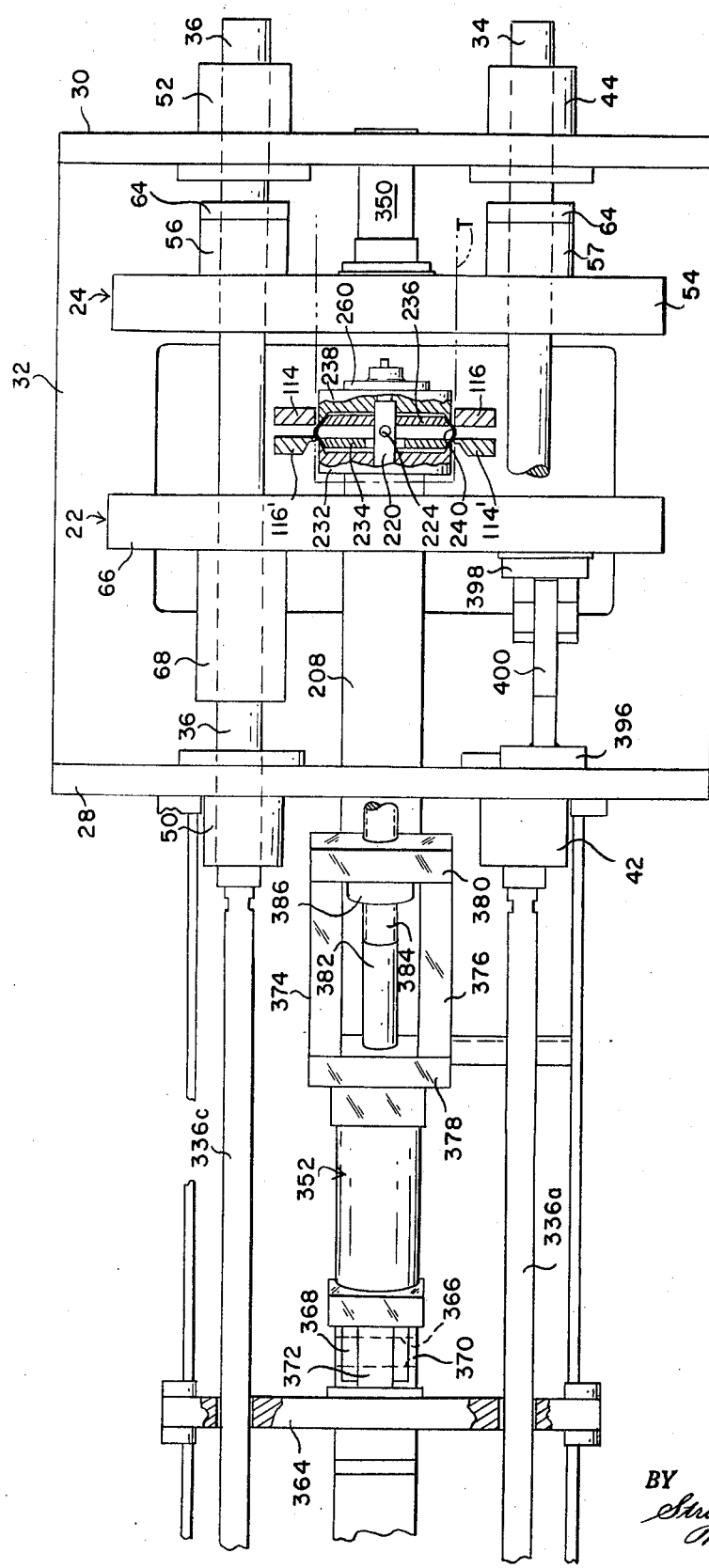
FIG. 2A is a top plan view of the structure illustrated in FIG. 1A but showing the configuration of a component at the end of what will be hereinafter termed "stage 2"
Figure 2B:
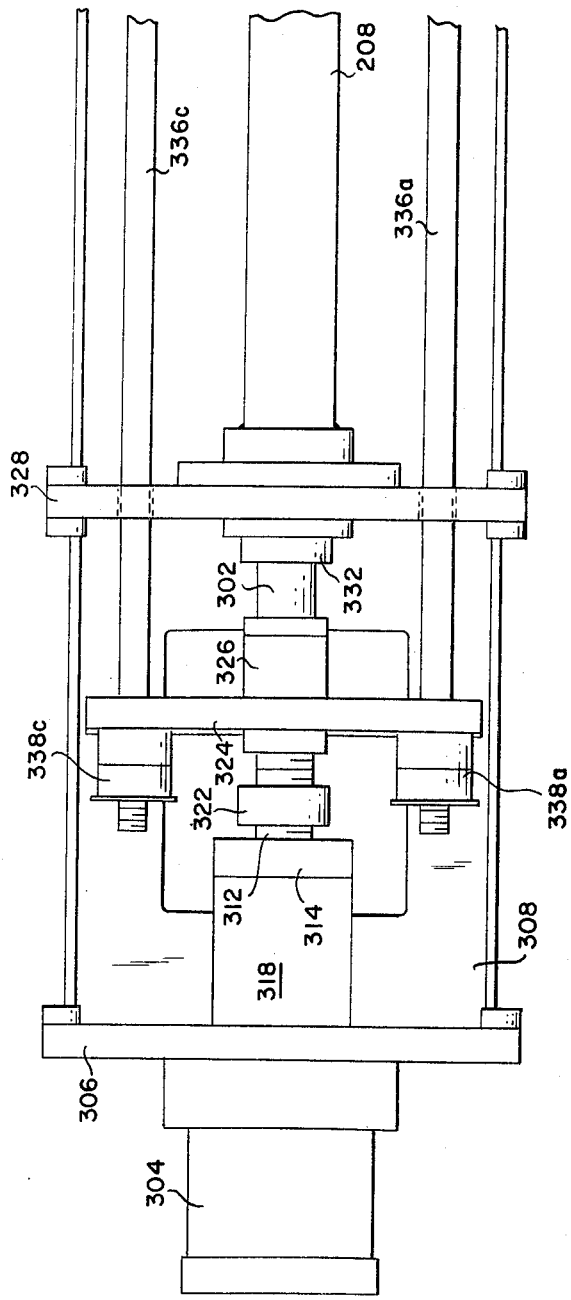
FIG. 2B is a top plan view of the structure illustrated in FIG. 1B and constituting a left hand extension of the view illustrated in FIG. 2A.

During stage 2, the chamber 276 internally of bladder 240 is pressurized thereby forcing the tube T radially outwardly between the clamp rings 114, 114', 116 and 116' of the slide clamps 74, 74', 76 and 76' to form an inchoate convolution of the form indicated at 280 in FIG. 9. FIGS. 2A and 2B illustrate the machine at the end of stage 2.

Figure 13:
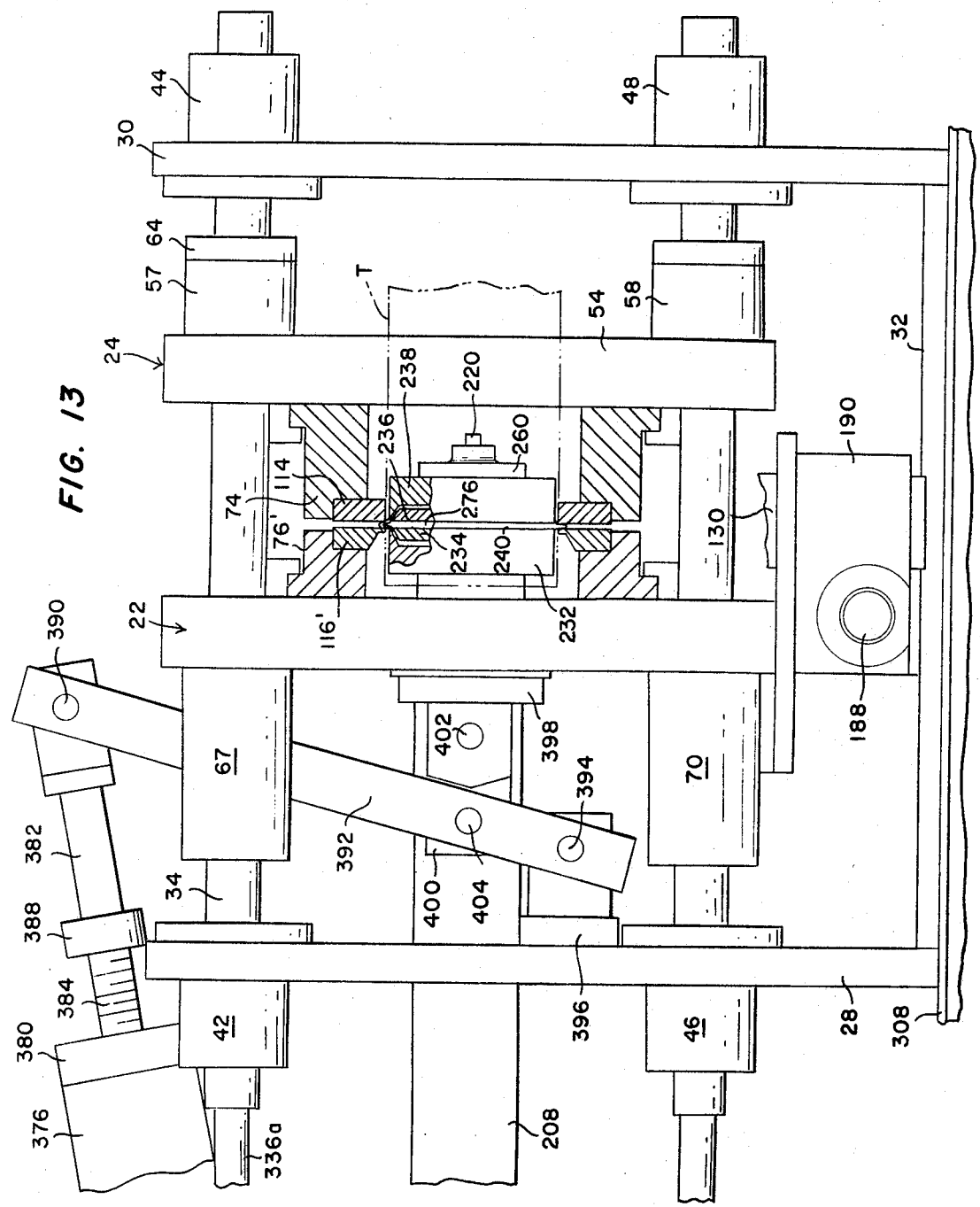
FIG. 13 is an enlarged side elevational view of the corrugation forming section of the machine of FIGS. 1A–2B illustrating the configuration of the components at the end of stage 3.

During stage 3, the aft platen assembly 22 and the aft disc 232 remain stationary while the forward platen assembly 24 and the forward disc 238 move to the left to complete the formation of the convolution. FIG. 13 illustrates the machine at the end of stage 3.

Figure 14:
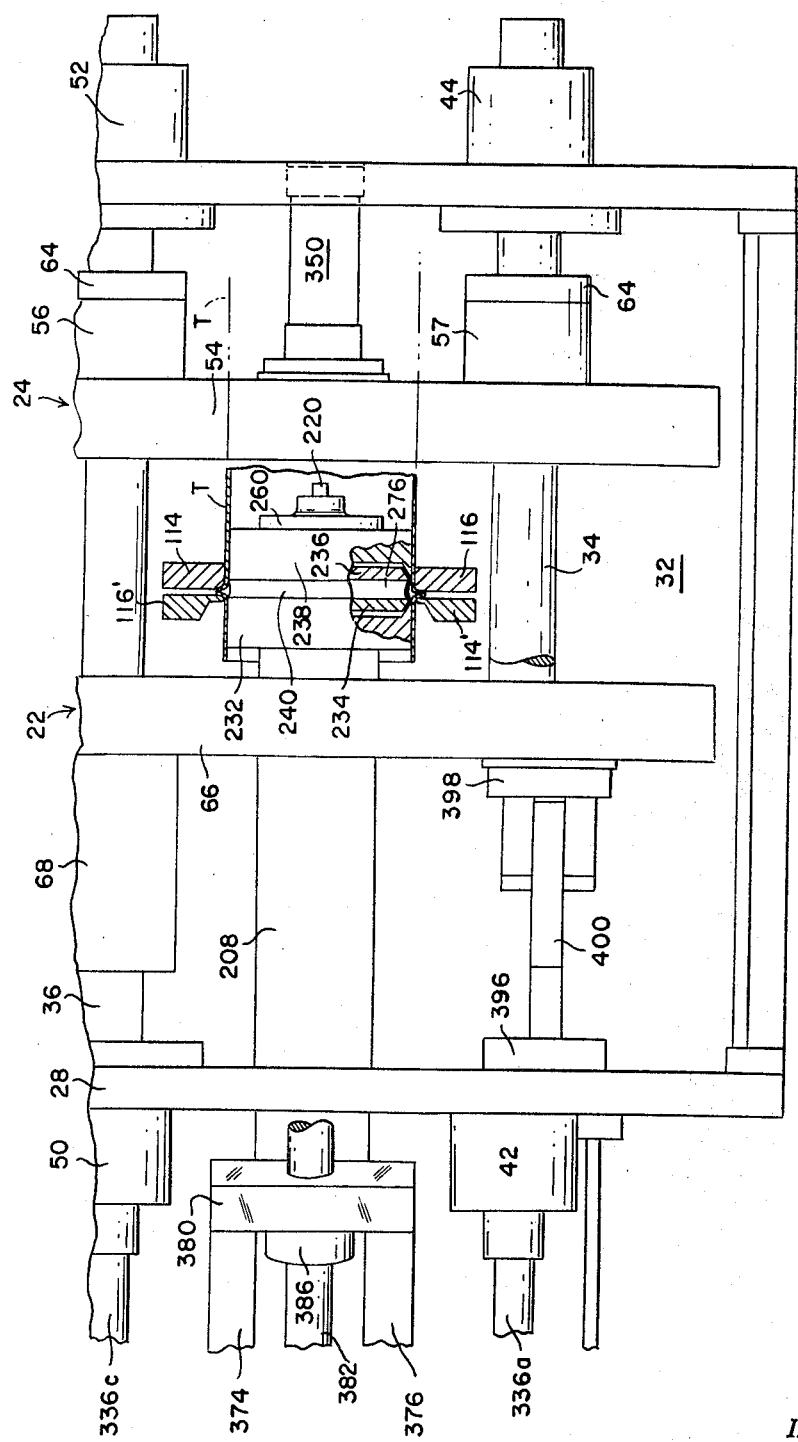
FIG. 14 is a top plan view of the corrugation forming section of the machine of FIGS. 1A–2B illustrating the configuration of the components at the end of stage 4.

At the end of stage 3, the pressure within chamber 276 is relieved and the discs 232 and 238 are separated by moving the disc 238 to the right to its original position. FIG. 14 illustrates the machine at the end of stage 4.

During stage 5, both platen assemblies 22 and 24 move slightly to the left to move the just completed convolution and the tube T sufficiently far to the left to align the next portion of a tube T in which a convolution is to be formed with the bladder 240 while the components of the mandrel head assembly 26 remain stationary. FIG. 15 illustrates the machine at the end of stage 5.

During stage 6, the slide clamping rings 116' and 114' are moved radially outwardly to release their embrace of the tube T, while the remaining components remain stationary.

During stage 7, the platen assemblies 22 and 20 are restored to their original position and in so doing, the slide clamps 74, 74', 76 and 76' are separated to their original degree of separation thus setting up the machine to recycle to form the next convolution. FIG. 16 illustrates the machine at the end of stage 7 and the beginning of stage 1.

The mechanism by which this machine is caused to sequence through the foregoing seven stages will now be described primarily by reference to FIGS. 1A, 1B, 2A, and 2B.

Stage 1 merely requires energization of the hydraulic motor 182 (FIG. 3) to lift the wedges 130 and 132 from their lower position to their elevated positions as illustrated in FIGS. 3 and 4 to thereby shift the slide clamps 74, 74', 76 and 76' to their closed positions as illustrated in FIGS. 3–6 inclusive.

Stage 2 requires pressurization of the chamber 276 internally of the annular bladder 240. As was explained in reference to FIG. 7, chamber 276 is in fluid communication with passages 222 and 224 in the shaft 220. Referring to FIGS. 1A and 1B, hydraulic fluid is supplied to the passages 222 and 224 (FIG. 7) through the hollow interior of shaft 212 and an inlet passage 300 of a fitting 302 which is fixed to the aft end of the shaft 212 from a suitable hydraulic pressure source (not shown). Activation of this source of hydraulic pressure at the end of stage 1 and deactivation of this source at the end of stage 4 through suitable hydraulic relays transmits hydraulic pressure through the inlet passage 300, the through bore of the shaft 212, and the passages 222 and 224 in the shaft 220 to the interior of the chamber 276 (FIG. 7) to thereby cause the annular bladder 240 to expand from its relaxed position as shown in FIG. 1A to its expanded position as shown in FIG. 2A and remain in its expanded position until the end of stage 3 when it is restored to its relaxed position as illustrated in FIG. 14 by relief of the internal pressure. As the annular bladder 240 expands between the rings 114, 114', 116 and 116' during stage 2, it forms an inchoate convolution of the form indicated at 280 in the tube T in FIG. 9.

Stage 3 requires simultaneous aftward movement of the forward platen assembly 24 including slide clamps 74 and 74' with their ring segments 114 and 114' and of the disc 238 and bladder 240 of the mandrel assembly 26. This motion is effected by energization of a hydraulic motor 304 shown in FIG. 1B. Hydraulic motor 304 is of the piston type. Its cylinder is fixed to a frame plate 306 fixed to the base 308 to which the frame plates 28, 30 and 32 (FIG. 1A) are also fixed. The piston (not shown) of fluid motor 304 is fixed to a rod or shaft 310 projecting through the plate 306 and to which is coaxially fixed an externally threaded shaft 312. Shaft 312 extends through an aligned aperture in a stop plate 314 which is suitably fixed to the frame plate 306 by support plates 316 and 318. A pair of stop collars 320 and 322 are threaded upon the shaft 312. The abutment of collar 320 against the stop plate 314 establishes the limit of forward motion of the piston of the motor 304 and the abutment of the collar 322 against the stop plate 314 establishes the aft limit of motion of the piston of the motor 304. By selective adjustment of the positions of collars 320 and 322 along shaft 312, the limit positions and length of stroke of shaft 312 can be varied.

The shaft 312 is fixed to a movable plate member 324 the hub 326 of which is fixed to the fitting 302. By this construction, since the fitting 302 is fixed to the shaft 212, energization of the hydraulic motor 304 to move the rod 310 and the shaft 312 to the left as viewed in FIG. 1B to bring the stop collar 322 into abutment with the stop plate 314 will move the shaft 212, the shaft 220 and the discs 236 and 238 to the left as viewed in FIG. 1A until they reach the position illustrated in FIG. 13 thereby permitting further outward expansion of the bladder 240 as the chamber 276 contracts axially.

Referring again to FIG. 1B, as is there apparent, the aft end of the shaft 208 which surrounds the shaft 212 is fixed to a vertical frame plate 328 through a mounting collar 330. Frame plate 328 has a bearing sleeve 332 fixed therein in coaxial relation with the shaft 208 to provide a bearing support for the fitting 302 permitting its axial movement relative to the fixed frame plate 328, plate 328 being fixed to the base structure 308.

Aft movement of the piston of the motor 304 also moves the plate 324 to the left as viewed in FIG. 1B. Plate 324 is of generally square configuration in a plane perpendicular to the axis of shaft 312 and adjacent each corner has a bearing, two of which are indicated in FIG. 1B at 334a and 334b. Through each of such bearings there extends, in axially slidable relation, a tie-rod three of which are indicated at 336a, 336b, and 336c. At the aft end of the tie-rods 336 to the rear of the plate 324 are fixed stop collars 338 three of which are indicated at 338a, 338b and 338c. By this construction, when the plate 324 is moved to the left as viewed in FIG. 1B under the influence of the hydraulic motor 304, it will abut the collars 338 and move the tie-rods 336 to the left as viewed in FIG. 1B but when the motor 304 moves the plate 324 to the right as viewed in FIG. 1B, the tie-rods 336 will remain stationary and the plate 324 will move to the right sliding over the rod 336 due to the slide bearings 334.

As is apparent from FIG. 1A, the tie-rods 336 are coaxial with and fixed at their forward ends to the rods 34, 36, 38 and 40 which slidably support aft platen assembly 22 and which are fixed to and support the forward platen assembly 24. Thus, energization of motor 304 to pull plate 324 to the left as viewed in FIG. 1B will move platen assembly 24 from its FIG. 2A position to its FIG. 13 position thereby axially compressing the ends of the inchoate convolution to complete its formation.

Stage 4 requires relief of the fluid pressure within the chamber 276 to permit the bladder 240 to relax and simultaneous movement of the discs 236 and 238 of the mandrel assembly 26 to the right as viewed in FIG. 1A to disengage the bladder 240 from the now completed convolution. Relief of pressure within the chamber 276 is effected by disconnection of the conduit 300 (FIG. 1B) from the pressure source by actuation of a suitable hydraulic relay (not shown). Restoration of the discs 236 and 238 to their FIG. 1A or forward positions requires energization of the fluid motor 304 (FIG. 1B) to move the shaft 310 to the right as viewed in FIG. 1B to bring the stop collar 320 into engagement with the stop plate 314. This moves the shaft 212, the shaft 220 (FIG. 1A)

and the discs 236 and 238 to the right as viewed in FIG. 1A and FIG. 14. The energization of motor 304 to move the shaft 312 to the right as viewed in FIG. 1B has no effect upon the position of the forward platen assembly 24 (FIG. 1A) since the plate 324 has a sliding connection through the bearings 334 with pull rods 336 when the plate 324 is moved to the right as viewed in FIG. 1B.

Referring again to FIG. 12, in stage 5, both the forward and the aft platen assemblies 22 and 24 move to the left to index the tube T the space of one convolution while the mandrel assembly 26 remains fixed. The configuration of the convolution forming section at the end of stage 5 is illustrated in FIG. 15.

This simultaneous aftward movement of the two platen assemblies 22 and 24 is effected by simultaneous energization of two fluid motors 350 and 352 both shown in FIG. 1A.

Motor 350 is a piston type hydraulic motor the cylinder of which is fixed to the casting 54 of the forward platen assembly 24 (see also FIG. 6). The piston of motor 350 is connected through a rod 354 extending in axially slidable relation through an aligned bore 356 in casting 54 and having a reduced diameter shank 358 extending through an aligned aperture in the casting 66 of the aft platen assembly 22. Rod 354 has a shoulder 360 which abuts face 72' of casting 66 and a nut 362 at the opposite end of the reduced diameter shank 358 by which the rod 354 is fixed relative to the casting 66. By this construction, energization of the motor 350 to move its piston to the right as viewed in FIG. 1A will bring the platen assemblies 22 and 24 together or lock them in their adjacent positions and energization of the motor 350 to move the piston thereof to the left as viewed in FIG. 1A will cause separation of the platen assemblies 22 and 24 or lock them in their separated positions.

During stage 5, motor 350 is energized to lock the two platen assemblies 22 and 24 in their convergent relative positions.

Referring to FIG. 1A, the motor 352 is also a hydraulic motor of the piston type. Its cylinder is pivotally mounted upon a frame plate 364 which is fixed to the base structure 308 in parallel relation to the frame plates 28 and 30. As is apparent by reference to FIGS. 1A and 2A, the pivotal connection between motor 352 and frame plate 364 is formed by a shaft 366 extending through aligned apertures and a pair of spaced parallel arms 368 and 370 on motor 352 and an intermediate arm 372 fixed to the plate 364.

At the other end of the motor 356 there is a rectangular frame structure formed by side plates 374 and 376 and end plates 378 and 380 which are rigidly interconnected and connected to the end of the cylinder of the motor 352. The piston rod 382 of the hydraulic motor 352 extends through aligned apertures in the plates 378 and 380, having a threaded section 384 upon which is received a stop collar 386 at the side of the plate 380 adjacent the motor 352 as is shown in FIG. 2A and a further stop collar 388 on the threaded section 384 in the side of plate 380 opposite stop collar 386 as is shown in FIG. 1A. By this construction and by selective rotary adjustment of the stop collars 386 and 388 along the threaded section 384 of the piston rod 382, the limits of motion of the piston rod 382 are established.

With continued reference to FIG. 1A, the forward end of the piston rod 382 is pivotally connected by a shaft 390 to the upper end of a yoke 392 the legs of which are on opposite sides of the shaft 208 and which are pivotally mounted to the frame plate 28 by aligned shafts 394 carried by support brackets 396 fixed to the plate 28. The arms of the yoke 392 are pivotally connected to the casting 66 of the aft platen assembly 22 by connections each consisting of a bracket 398 fixed to the aft face of the casting 66 and a pivot link 400 pivotally connected by a shaft 402 to the bracket 398 and by a shaft 404 to the leg of the yoke 392.

By this construction, energization of the hydraulic motor 352 to move its piston to the left as viewed in FIG. 1A will shift the aft platen assembly 22 to the left as viewed in FIG. 1A to the position indicated in FIG. 15 and, since during stage 5 the forward platen assembly 24 is locked to the aft platen assembly 22 by the fluid motor 350, it will also shift the forward platen assembly in the aft direction to bring the platen assemblies 22 and 24 to the positions illustrated in FIG. 15. Since the rods 34, 36, 38 and 40 are fixed to the forward platen assembly 24 and to the tie-rods 336, these rods will also move to the left as viewed in FIGS. 1A and 1B upon energization of the fluid motor 352 to shift the yoke 392 to the full line position illustrated in FIG. 15.

Since the convolution which was completely formed during stage 3 is embraced between the slide clamps 74, 74', 76 and 76' during stage 5, this motion of the platen assemblies 22 and 24 will move the tube T to the left as viewed in FIG. 1A to align the next adjacent uniformed area of the tube T with the bladder 240 of the mandrel assembly 26 as is clearly apparent from FIG. 15.

During stage 6, the slide clamps 74, 74', 76 and 76' are moved to their open positions by energization of the hydraulic motor 182 to rotate the shafts 188 and 196 (FIG. 3) to lower the wedges 130 and 132 to permit the slide clamps 74, 74', 76 and 76' to shift to their open positions under the influence of the biasing springs 118–124 and 118'–124'.

During stage 7, the platen assemblies 22 and 24 are restored to their forward positions by energization of the fluid motor 352 and 350 to move yoke 392 to the right in a clockwise direction about the shaft 394 and to separate the platten assemblies 22 and 24 respectively. This brings the mechanism to the configuration as shown in FIG. 16 to where it is ready to recycle by closing the slide clamps to form the next successive convolution.

When it is desired to form convolutions in the end regions of a pair of butt welded preconvoluted tube sections as shown in FIG. 10, the ring segments used on both the forward and aft platen assemblies 22 and 24 are in cross-section of the form illustrated for the clamp ring segments 116' in FIG. 7 so that the slide clamp rings will not interfere with the previously formed convolution.

These slide clamp rings 114 and 114', 116 and 116' are readily removable so that ring segments of different internal diameter and different thickness may be readily mounted in the machine to accommodate different diameter tubes and different forms of convolution. The strokes of the several hydraulic motors involved are adjustable to accommodate different axial lengths for the convolutions to be formed.

By the foregoing construction, the present invention provides novel bellows as well as a highly versatile and improved bellows forming machine and method which permits rapid fabrication of large diameter convoluted conduit or bellows of substantial wall thickness. It is also adaptable to the formation of multi-walled bellows merely by insertion into the machine of a pair of concentric tubes so that the machine forms convoutions simultaneously in the inner and outer tube. This results in interlocked convoluted tube with a slight space in between the inner and outer walls.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A tube convoluting machine comprising:
(a) a first means for externally embracing a tube in a pair of axially spaced, substantially circumferentially continuous circumferential bands, said first means comprising a pair of aligned, axially movable platen assemblies each having a centrally apertured base member, a plurality of slide clamps mounted on said base member for movement between convergent and divergent positions transversely of the axis of the aperture of said base member, and means resiliently biasing said slide clamps to their divergent positions, the slide clamps on each of said platens having means thereon defining, when said slide clamps are in their convergent positions, said substantially continuous circumferential bands;
(b) a second means for subjecting the portion of the tube intermediate said circumferential bands to a uniform internal pressure sufficient to inelastically outwardly deform said tube between said bands;
(c) a third means for contracting the axial spacing between said circumferential bands to inelastically axially contract said tube while said internal pressure is maintained to continue the inelastic outward deformation of said tube between said bands;
(d) a fourth means operative upon completion of the axial contracting action of said third means to terminate operation of said second means;
(e) a fifth means operative in one direction upon termination of operation of said second means for axially shifting said tube and said first means to a position to align an adjacent portion of said tube with said second means while maintaining the contracted axial spacing between said circumferential bands; and
(f) a sixth means operative prior to completion of operation of said fifth means to maintain the embracing action of said first means and upon completion of the operation of said fifth means to terminate such embracing action, said sixth means comprising a pair of wedges mounted on one of said platen assemblies for rectilinear reciprocation in paths normal to the paths of said slide clamps, each of said wedges engaging complementary surfaces on a slide clamp on each of said platen assemblies, a hydraulic motor, and means operatively connected to said hydraulic motor for simultaneously reciprocating said wedges between first and second limit positions, said wedges being effective in said first limit position to maintain said slide clamps in their convergent positions and in said second limit position to permit movement of said slide clamps to their divergent positions under the influence of said resilient biasing means:
(g) said fifth means being operative upon termination of such embracing action to simultaneously axially expand the spacing between said circumferential bands and restore said first means to alignment with said second means.

2. The machine defined in claim 1 wherein said second means comprises a mandrel assembly providing axially spaced rigid external continuous tube support surfaces and an intermediate axially aligned outwardly expansible surface, said expansible surface being disposed between said circumferential bands whereby, upon outward expansion of said surface against the internal surface of a tube supported by said mandrel rigid surfaces, an inchoate convulsion will be formed in such tube between such circumferential bands.

3. A tube convoluting machine comprising:
(a) a first means for externally embracing a tube in a pair of axially spaced, substantially circumferentially continuous circumferential bands, said first means comprising a pair of aligned, axially movable platen assemblies each having a centrally apertured base member, a plurality of slide clamps mounted on said base member for movement between convergent and divergent positions transversely of the axis of the aperture of said base member, and means resiliently biasing said slide clamps to their divergent positions, the slide clamps on each of said platens having means thereon defining, when said slide clamps are in their convergent positions, said substantially continuous circumferential bands;
(b) a second means for subjecting the portion of the tube intermedite said circumferential bands to a uniform internal pressure sufficient to inelastically outward deform said tube between said bands, said second means comprising a mandrel assembly located adjacent one end if said machine and mounted on one end of a mandrel shaft assembly longitudinally of said machine and in fixed relation to said machine at the end thereof opposite said mandrel assembly;
(c) a third means for contracting the axial spacing between said circumferential bands to inelastically axially contract said tube while said internal pressure is maintained to continue the inelastic outward deformation of said tube between said bands;
(d) a fourth means operative upon completion of the axial contracting action of said third means to terminate operation of said second means;
(e) a fifth means operative in one direction upon termination of operation of said second means for axially shifting said tube and said first means to a position to align an adjacent portiin of said tube with said second means while maintaining the contracted axial spacing between said circumferential bands; and
(f) a sixth means operative prior to completion of operation of said fifth means to maintain the embracin action of said first means and upon completion of the operation of said fifth means to terminate such embracing action, said sixth means comprising a pair of wedges mounted on one of said platen assemblies for rectilinear reciprocation in paths normal to the paths of said slide clamps, each of said wedges engaging complementary surfaces on a slide clamp on each of said platen assemblies, a hydraulic motor, and means operatively connected to said hydraulic expand the spacing between said circumferential bands and restore said first means to alignment with motor for simultaneously reciprocating said wedges between first and second limit positions, said wedges being effective in said first limit position to maintain said slide clamps in their convergent positions and in said second limit position to permit movement of said slide clamps to their divergent positions under the influence of said resilient biasing means;
(g) said fifth means being operative upon termination of such embracing action to simultaneously axially said second means.

4. The machine defined in claim 3 wherein said mandrel shaft assembly comprises a fixed tubular shaft and a central shaft mounted for limited longitudinal reciprocation coaxially therein and wherein said mandrel assembly comprises a pair of equal diameter discs fixed respectively to said tubular and central shafts in axially spaced relation and a tubular bladder extending between and fixed at its opposite ends in fluid tight relation to said discs to refine a chamber internally thereof, and means far pressurizing said chamber to cause outward expansion of said bladder.

5. The machine defined in claim 4 wherein said fourth means is connected to simultaneously relieve the fluid pressure within said fluid chamber and to axially expand the spacing between said mandrel discs to thereby disengage said bladder from the just formed convolution of a tube supported by said mandrel.

6. The tube convoluting machine of claim 5, together with means for activating said fourth means prior to the activation of said fifth means, whereby said bladder is disengaged from the just formed convolution prior to the axial shifting of the tube being formed.

7. The machine defined in claim 4 wherein said pressurizing means includes a fluid conduit extending longitudinally of said mandrel shaft assembly internally of and from one end to the other of said fixed tubular shaft.

8. The machine defined in claim 4 wherein said third means is connected to said central shaft to contract the axial spacing between said discs simultaneously with the axial contraction of the spacing between said circumferential bands.

9. The machine defined in claim 4 wherein said fourth means is connected to activate said third means to restore said mandrel shaft assembly central shaft and the discs fixed to the end thereof to the expanded relative axial spacing of said discs, said third means having a unidirection connection to said platen assemblies so that said platen assemblies remain in their axially contracted relative positions while said mandrel assemblies discs are being so restored.

10. The machine defined in claim 9 wherein said fifth means comprises means for maintaining said platen assemblies in their axially contracted relative positions and means for simultaneously axially shifting both of said platen assemblies in a direction opposite to the direction of restoration movement of said mandrel assembly central shaft through a distance equal to the length of the tube required to form a corrugation.

11. The machine defined in claim 1 wherein each of said platen assemblies has a pair of diametrically opposed slide clamps mounted thereon, each of said slide clamps having a substantially semi-circular clamp ring thereon, whereby said clamp rings define said substantially continuous circumferential bands.

12. The machine defined in claim 1 wherein said hydraulic motor has an output shaft and the means operatively connecting each of said wedges to said motor comprises a pinion rotatable by said output shaft and a rack fixed to the wedge and meshed with the pinion.

References Cited

UNITED STATES PATENTS

| | | | |
|---|---|---|---|
| 2,306,018 | 12/1942 | Fentress | 72—59 |
| 2,581,787 | 1/1952 | Dreyer | 72—59 |
| 2,825,387 | 3/1958 | Alltop | 72—59 |
| 2,954,064 | 9/1960 | De Mers | 72—59 |
| 3,105,539 | 10/1963 | Johnson | 72—59 |

RICHARD J. HERBST, Primary Examiner

UNITED STATES PATENT OFFICE
CERTIFICATE OF CORRECTION

Patent No. 3,512,385　　　　　　　　　　　　　　　　　　May 19, 1970

George F. Adolphi

It is certified that error appears in the above identified patent and that said Letters Patent are hereby corrected as shown below:

Column 3, line 26, "mechanism" should read -- mechanisms --; line 41, "8" should read -- 88 --; line 56, "16" should read -- 116 --. Column 4, line 58, "wedge" should read -- wedges --; line 67, "on" should read -- in --. Column 6, line 3, after "radially" cancel "outwardly", second occurrence; line 5, cancel "(" and insert -- , --; line 45, after "it" insert -- is --. Column 10, lines 21 and 22, "uniformed" should read -- unformed --; line 62, "convoutions" should read --convolutions --. Column 11, line 54, the colon should read a semicolon. Column 12, line 31, "portiin" should read -- portion --; lines 46 and 47, should be canceled; line 56, after "axially" insert -- expand the spacing between said circumferential bands and restore said first means to alignment with --; line 66, "refine" should read -- define --; line 67, "far" should read -- for --. Column 13, line 21, "assemblies" should read -- assembly --. Column 11, line 68, "convilution" should read -- convolution --.

Signed and sealed this 27th day of October 1970.

(SEAL)
Attest:

EDWARD M. FLETCHER, JR.　　　　　　　　　　　WILLIAM E. SCHUYLER, JR.
Attesting Officer　　　　　　　　　　　　　　Commissioner of Patents